United States Patent
Adhikari et al.

(10) Patent No.: US 8,446,432 B2
(45) Date of Patent: May 21, 2013

(54) CONTEXT AWARE USER INTERFACE SYSTEM

(75) Inventors: Suranjit Adhikari, San Diego, CA (US); Steven Friedlander, San Diego, CA (US)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 13/180,850

(22) Filed: Jul. 12, 2011

(65) Prior Publication Data
US 2013/0016113 A1 Jan. 17, 2013

(51) Int. Cl.
*G09G 5/00* (2006.01)

(52) U.S. Cl.
USPC ........... 345/636; 345/619; 345/635; 345/672; 345/676; 382/287; 382/291; 382/292; 715/246; 715/788; 715/790; 715/799

(58) Field of Classification Search .......... None
See application file for complete search history.

(56) References Cited

U.S. PATENT DOCUMENTS

| | | | | |
|---|---|---|---|---|
| 5,822,123 A | * | 10/1998 | Davis et al. | 725/43 |
| 7,149,968 B1 | * | 12/2006 | Ackerschewski et al. | 715/255 |
| 7,437,678 B2 | * | 10/2008 | Awada et al. | 715/784 |
| 7,770,109 B2 | | 8/2010 | Fortes | |
| 2005/0210407 A1 | | 9/2005 | Bates et al. | |
| 2006/0117272 A1 | * | 6/2006 | Sawada et al. | 715/802 |

* cited by examiner

*Primary Examiner* — Antonio A Caschera
(74) *Attorney, Agent, or Firm* — Fitch, Even, Tabin & Flannery LLP

(57) ABSTRACT

Methods and apparatus for presenting image data to include a graphic element. In one embodiment a method includes acquiring image data from a display buffer of a device, analyzing the image data to identify active and passive regions of the image data and ranking passive regions to determine a confidence measure for each passive region. The method may further include modifying the image data for display on the device to include a graphic element, wherein the graphic element is presented in a passive region based on the ranking.

28 Claims, 4 Drawing Sheets

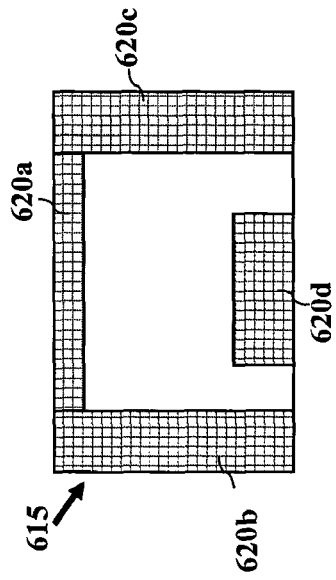
FIG. 6A
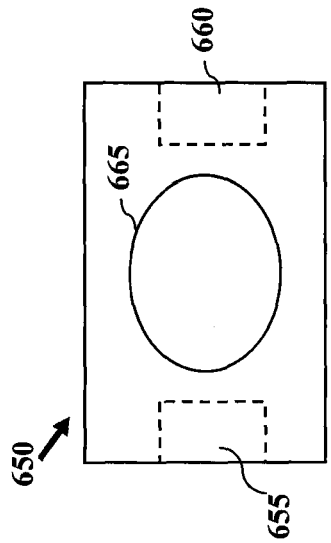
FIG. 6B
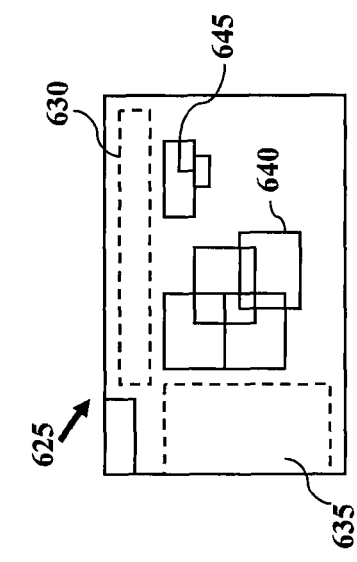
FIG. 6C
FIG. 6D

CONTEXT AWARE USER INTERFACE SYSTEM

FIELD

The present disclosure relates generally to electronic device and display applications, and more particularly to methods and apparatus for presenting graphic elements in addition to display of image data.

BACKGROUND

Many televisions and devices having a display provide notifications or messages to inform a user. The messages can be displayed temporarily, or in some instances, require user interaction to clear the message from the display. Many users find these messages to be helpful. However, when these messages block content or displayed text, vital information for the viewer may be lost. Typical prior art solutions may modify the display of image data by reducing the scale of the displayed image data in order to display a non-overlapping display of one or more graphical elements. These methods, however, similarly include the drawbacks of overlapping content in that the display may minimize or render viewing difficult for content of a desired stream. Another drawback of conventional devices and methods for displaying content on a display device is the inability to determine and display content in regions that are not important. Accordingly, there is a desire for functionality by display devices and applications that overcome one or more of the aforementioned drawbacks and provide useful technological solutions and functionality that may improve visual quality.

BRIEF SUMMARY OF THE EMBODIMENTS

Disclosed and claimed herein are methods and apparatus for presenting image data. In one embodiment, a method includes acquiring image data from a display buffer of a device, analyzing the image data to identify active and passive regions of the image data, and ranking passive regions to determine a confidence measure for each passive region. The method further includes modifying the image data for display on the device to include a graphic element, wherein the graphic element is presented in a passive region based on the ranking.

Other aspects, features, and techniques will be apparent to one skilled in the relevant art in view of the following detailed description of the embodiments.

BRIEF DESCRIPTION OF THE DRAWINGS

The features, objects, and advantages of the present disclosure will become more apparent from the detailed description set forth below when taken in conjunction with the drawings in which like reference characters identify correspondingly throughout and wherein:

FIGS. 6A-6D depict graphical representations of image data displayed according to one or more embodiments.

DETAILED DESCRIPTION OF THE EXEMPLARY EMBODIMENTS

Overview and Terminology

Figure 1:
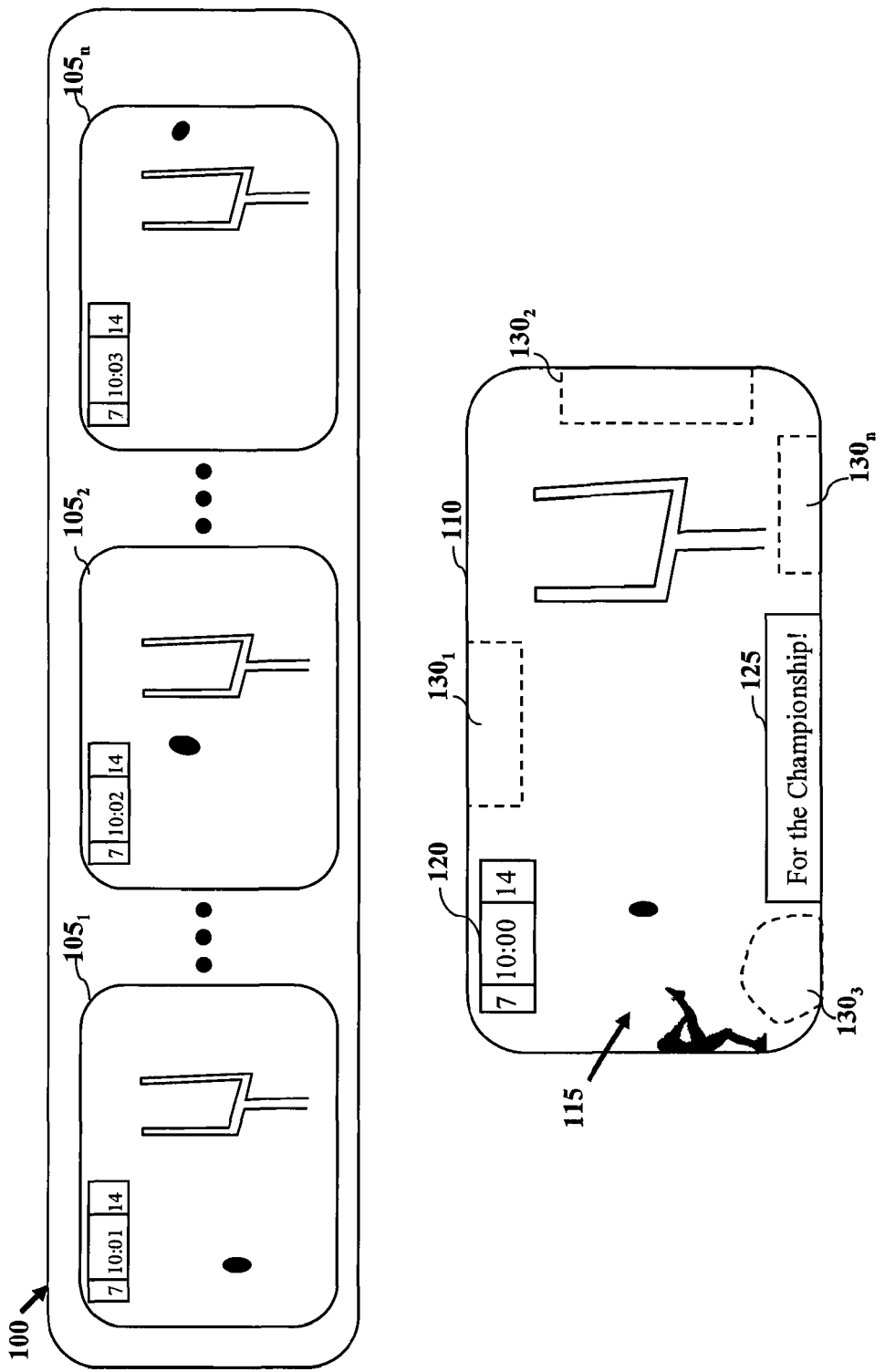
FIG. 1 depicts a graphical representation of acquiring image data according to one or more embodiments.

One aspect of the of the disclosure relates to determining positioning and display attributes for presenting a graphic element in conjunction with display of image data, such as video data. Methods and apparatus are provided for dynamically analyzing image data for display and presenting one or more graphic elements based on the content of the image data. One advantage of the embodiments described herein, may be the ability to present graphic elements overlaying displayed image data while avoiding overlay of vital or desired data for a user. Graphic elements, such as device commands, digital video recording (DVR) and playback commands, access to lists of channels, programming guides, and broadcast information, may be positioned based on the displayed content by a device. Similarly, graphic elements may be presented for messages, such as one or more of a social networking application message, email, dialogue box, instant messaging application, weblog, etc. Analysis of image data for display may allow of preventing overlays on screen layout of image data and particular arrangements of user interfaces.

In one embodiment, a method is provided for presenting a graphic element that includes acquiring image data from a display buffer of a device and analyzing the image data to identify active and passive regions. Identified passive regions may be ranked to determine a confidence measure for each passive region. The image data may be modified to display on a device to include a graphic element presented in a passive region based on the ranking. In contrast to conventional methods for displaying a graphic element, the positioning of a graphical element is not fixed to a particular location and presentation of the graphic element may be positioned to avoid obstruction of image data elements.

In another embodiment, a device is provided which may be configured to analyze content of a display buffer and present a graphical element based on image data stored in the display buffer. The device may relate to a device having a display, or a device configured to process image data for a display.

As used herein, the terms "a" or "an" shall mean one or more than one. The term "plurality" shall mean two or more than two. The term "another" is defined as a second or more. The terms "including" and/or "having" are open ended (e.g., comprising). The term "or" as used herein is to be interpreted as inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

Reference throughout this document to "one embodiment," "certain embodiments," "an embodiment," or similar term means that a particular feature, structure, or characteristic described in connection with the embodiment is included in at least one embodiment. Thus, the appearances of such phrases in various places throughout this specification are not necessarily all referring to the same embodiment. Furthermore, the particular features, structures, or characteristics may be combined in any suitable manner on one or more embodiments without limitation.

In accordance with the practices of persons skilled in the art of computer programming, one or more embodiments are described below with reference to operations that are performed by a computer system or a like electronic system. Such operations are sometimes referred to as being computer-executed. It will be appreciated that operations that are symbolically represented include the manipulation by a processor, such as a central processing unit, of electrical signals representing data bits and the maintenance of data bits at memory locations, such as in system memory, as well as other processing of signals. The memory locations where data bits are maintained are physical locations that have particular electrical, magnetic, optical, or organic properties corresponding to the data bits.

When implemented in software, the elements of the embodiments are essentially the code segments to perform the necessary tasks. The code segments can be stored in a processor readable medium, which may include any medium that can store or transfer information. Examples of the processor readable mediums include an electronic circuit, a semiconductor memory device, a read-only memory (ROM), a flash memory or other non-volatile memory, a floppy diskette, a CD-ROM, an optical disk, a hard disk, etc.

Exemplary Embodiments

Referring now to the figures, FIG. 1 depicts a graphical representation of image data acquisition which may be employed by one or more embodiments to present graphic elements. FIG. 1 includes image data 100 which may relate to content for display by a device stored in a buffer of a device. For example, image data 100 may relate to video image data stored in a frame buffer prior to display by a device. According to one embodiment, image data 100 may be dynamically analyzed to determine passive and/or active regions of the image data in order to present one or more graphic elements. Based on an analysis of image data 100 by a device, one or more graphic elements may be presented with existing content of image data 100.

Image data 100 is depicted as including frames $105_{1-n}$. Frames $105_{1-n}$ may be frames of video data, such as broadcast data, data read from media (e.g., a video disc, Blu-ray™, etc.), and data stored by the device. In one embodiment, one or more frames of image data 100 may be acquired to analyze the image data. The one or more frames may be acquired from a buffer of the device and may be converted to an image, depicted as 110, which may be employed to identify active and/or passive regions of image data 100. In one embodiment, sequential frames of image data 100 may be combined or converted to generate image 110. In another embodiment, non-sequential frames of image data 100 may be combined or converted to image 110. Image 110 includes content generally depicts as 115 which may be the subject of the image data 100. Content 115 relates to exemplary video imagery of a sporting event, which may be described as primary content. In addition to the primary content of the image data 100, one or more graphic elements may be included in image data 100. By way of example, image 110 includes graphical element 120 which relates to a score and timing indicator. Image 110 additionally includes graphic element 125 including a text display. Graphic elements 120 and 125 may relate to content added to image data 100 by a broadcaster when image data 100 relates to broadcast video data. However, similar forms of content may be provided by other media types. For example, when image data 100 relates to a movie, the image data may include graphic elements for subtitles that are overlaid on the primary image content. Image 110 may be generated by a device to account for graphic elements, such as graphic elements 120 and 125 and to identify active and passive regions.

FIG. 1 depicts passive regions $130_{1-n}$ determined by a device based on image 110. Passive regions $130_{1-n}$ may be areas of image data 100 where there is a low probability of blocking vital pieces of information on screen. For example, a passive region may be a region where there is a low probability of text. Similarly, a passive region may be a region with a high frequency of a particular color, or small set of colors. As will be discussed herein passive regions may be determined based on one or more additional attributes. It should also be appreciated that passive regions may be determined based on active regions of the image 110 as will be discussed below. According to another embodiment, passive regions may be identified to determine positioning for a graphic element.

Figure 2:
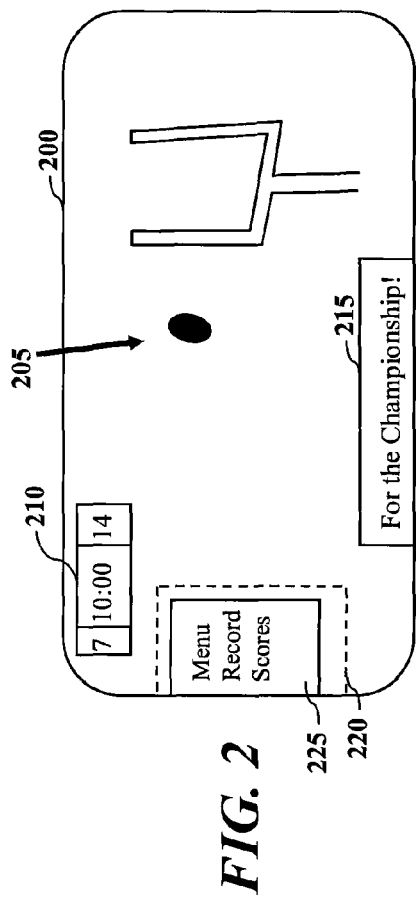
FIG. 2 depicts a graphical representation of image data including a graphic element displayed in a passive region according to one or more embodiments.

Referring now to FIG. 2, a graphical representation is depicted of image data that may be displayed by a device. FIG. 2 may relate to a display window of a device based on analysis of image data of FIG. 1. By way of example, based on one or more passive regions (e.g., passive regions $130_{1-n}$) identified in an image (e.g., image 110), the device may display a graphic element in addition to image data. FIG. 2 depicts display window 200 of a device. Image data display by the device is generally referred to as 205, which may relate to video or image data; and may include graphic elements 210 (e.g., graphic element 120) and graphic element 215 (e.g., graphic element 125). According to one embodiment, based on an analysis of image data for display, such as image data stored by a buffer of the device, the device may select passive area 220 and present graphic element 225 in passive area 220. As such, graphic element 225 may be presented without blocking vital sections of the image data on a screen. In addition, screen layouts presented by the device may be varied and may differ based on the application in use. As such, presentation of graphic element 225 based on analysis of image data may improve user experience.

Graphic element 225 is depicted as a user interface menu to allow a user to select one or more elements of the menu to control operation of a device. However, it should be appreciated that other types of graphic elements may be presented. For example, graphic element 225 may be displayed for one or more selectable device commands such as digital video recording (DVR) commands, access to lists of channels, programming guides, broadcast information, etc. According to another embodiment, graphic element 225 may be a message such as one or more of a social networking application message, email, dialogue box, instant messaging application, web-log, etc. Further, as discussed herein graphic element 225 may be positioned and/or modified based on content of image data to be displayed.

Figure 3:
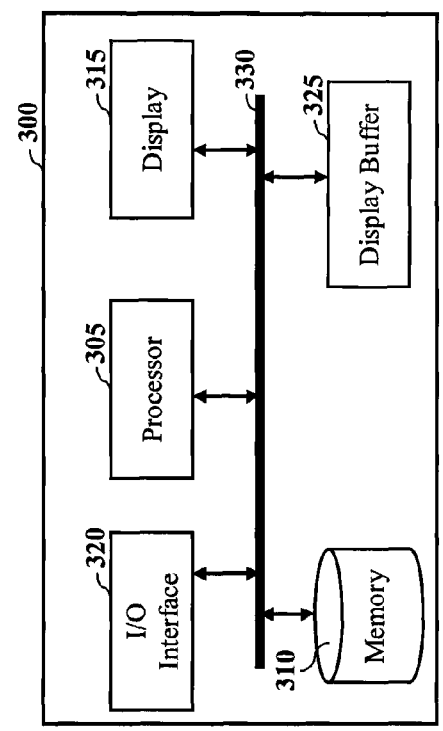
FIG. 3 depicts a simplified block diagram of a device according to one embodiment.

Referring now to FIG. 3, a simplified block diagram is depicted of a device according to one embodiment. Device 300 may relate to a device configured to display image data, including but not limited to display devices, personal communication devices, media players, etc. In certain embodiments, device 300 may relate to a peripheral device configured to interface with a display device, such as a set-top box, media player, etc. As depicted in FIG. 3, device 300 includes processor 305, memory 310, display 315, input/output (I/O) interface 320, and display buffer 325. Elements of Device 300 may be configured to communicate and interoperate by communication bus 330. Processor 305 may be configured to control operation of device 300 based on one or more computer executable instructions stored in memory 310. In one embodiment, processor 305 may be configured to control display of image content and provide a plurality of user control features. Memory 310 may relate to one of RAM and ROM memories and may be configured to store one or more files, and computer executable instructions for operation of device 300. Although depicted as a single memory unit, memory 310 may relate to one or more of internal device memory and removable memory. Memory 310 may store one or more digital books and bookmark files.

Display 315 may be employed to display image data, such as video data, and display one or more applications executed by processor 305. In certain embodiments, display 315 may relate to a touch screen display. I/O interface 320 may be employed to control operation of device 300 including controlling selection of content for display and controlling operation of device 300. I/O interface 320 may include one or more buttons for user input, such as a such as a numerical keypad, volume control, menu controls, pointing device, track ball, mode selection buttons, and playback functionality (e.g., play, stop, pause, forward, reverse, slow motion, etc). Buttons of I/O interface 320 may include hard and soft buttons, wherein functionality of the soft buttons may be based on one or more applications running on device 300. I/O interface 320 may include one or more elements to allow for communication by device 300 by wired or wireless communication. I/O interface 320 may include one or more ports for receiving data, including ports for removable memory. I/O interface 320 may be configured to allow for network based communications including but not limited to LAN, WAN, Wi-Fi, etc.

Display buffer 325 may be configured to drive display of image data by display 315. In one embodiment, display buffer 325 may be configured to store image data prior to display. In certain embodiments, display buffer 325 may be configured to store image data for periods of up to ten minutes. However, it should be appreciated that display buffer 325 may be configured to hold data for other time periods. According to another embodiment, display buffer 325 may be configured to output data stored by the buffer to processor 305 for analysis of image data. In certain embodiments, processor 305 may be configured to analyze image data stored by buffer 325 to monitor passive and active regions. In that fashion, the device may be configured to present a graphic element when a user input is detected based on image data analyzed in display buffer 325.

Figure 4:
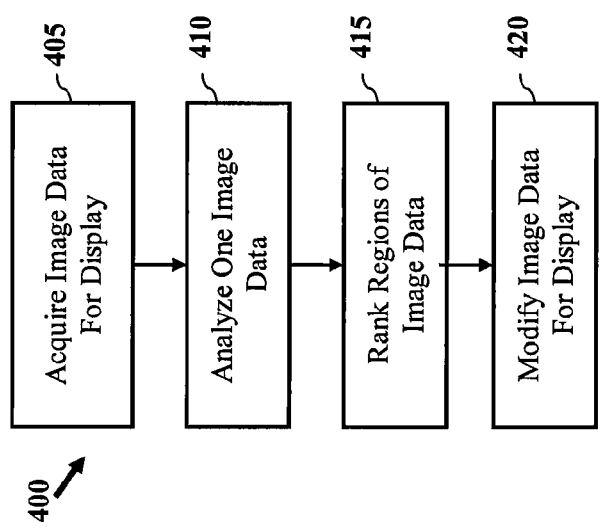
FIG. 4 depicts a process for presenting a graphic element according to one or more embodiments.

Referring now to FIG. 4, a process is depicted for presenting a graphic element according to one or more embodiments. Process 400 may be employed to dynamically present a graphic element by analyzing content for display and determining a position to overlay a graphic element which reduces the probability of disturbance to displayed image data. Process 400 may be employed by the device of FIG. 3, display devices, multimedia devices, devices configured to process image data for display devices, computing devices, personal communication devices, gaming systems, etc.

Process 400 may be initiated by acquiring image data for display at block 405. Image data acquired at block 405 may be stored by a display buffer (e.g., display buffer 325) for a device. Acquiring image data at block 405 may include segmenting the image data into one or more images, such as frames. In certain embodiments, the image data may be acquired at block 405 prior to display or output of image data by the device. For example, one or more frames stored in a display buffer may be provided to a processor prior to display. When a plurality of frames is acquired, the series of sequential frames may be analyzed. In certain embodiments, non-sequential frames may be analyzed, where one or more frames are selected during an interval of time, each of the frames separated by a time delay. In other embodiments, image data may be acquired at block 405 during display by the device. For example, output of a display buffer may be analyzed to characterize regions of the image data. In certain embodiments, the image data acquired at block 405 may be converted to a single image for analysis of passive and active regions. At block 405, image data may be acquired from a video stream to include one or more graphic elements and text elements.

At block 410, image data acquired at block 405 may be analyzed to determine active and passive regions. A processor may analyze image data using corner detection and moving window histogram analysis to determine active and passive regions. Corner detection may include detecting an intersection of two edges, or points, where two dominant and different edge directions in a local neighborhood of the point exist in the image data. A moving window histogram (e.g., sliding window histogram) may include generating data windows across an image to generate a histogram of visual data for each position. As such, pixels of the image data may be categorized into various classes to identify differing regions of elements of the image data. Based on characterization of the image data, regions may be selected to allow for display of a graphic element based on the image data. As discussed above, a passive region may be a region with a high frequency of a particular color, or a particular set of colors. Generally passive regions have a low probability of the display of text and varying values in a histogram window. Active regions may be regions with a high probability of text and a flat histogram window. In certain embodiments, text analysis of the image data may be performed using a cascade filter to create a feature set histogram window with one or more colors having a high values in the frequency domain.

Process 400 may continue by ranking passive regions at block 415. Passive regions may be ranked with a confidence measure characterizing the regions on a scale, of 0 to 1, for example. The regions may be ranked based on probability of a graphic element obscuring vital information and may additionally be based on one or more attributers of the graphic element to be displayed. For example, when a graphic element relates to a text or message box, display attributes of the message box, such as the display size of the message box may be considered when ranking regions.

At block 420, image data of the display may be modified to include the graphic element. For example, the largest contiguous passive area that a graphic element may be displayed may be selected. The graphic element may then be positioned in the selected passive region during display of the graphic element. In certain embodiments, a graphic element may be resized to conform to the passive regions of image data.

Figure 5A:
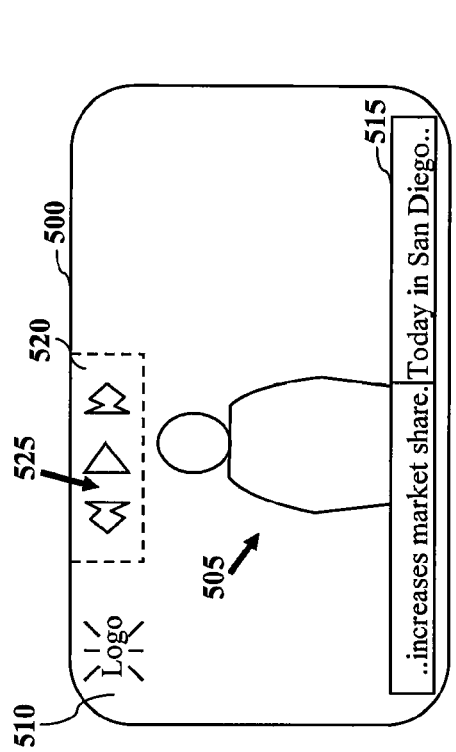
FIGS. 5A-5B depict graphical representations of image data displayed according to one or more embodiments.
Figure 5B:
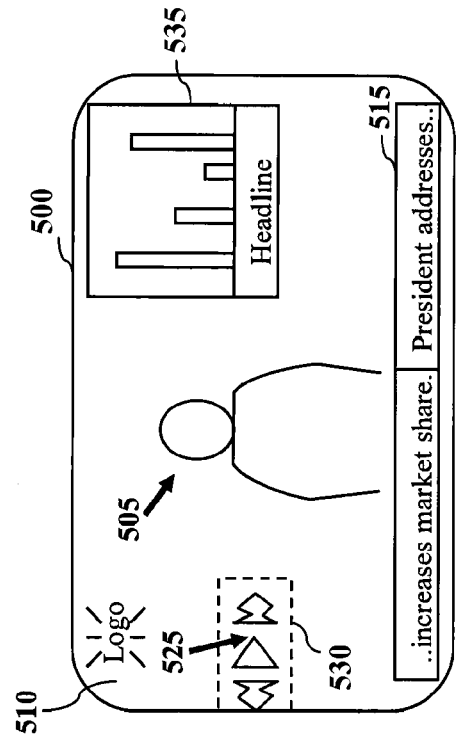

Referring now to FIGS. 5A-5B, graphical representations are depicted of a display window of a device including a graphic element according to one or more embodiments. Display window 500 may be displayed by a device based on analysis of image data to determine one or more active and passive regions. Image data displayed in display window 500 may include the subject of the video data 505 and one or more graphic elements, such as logo 510 and scrolling text display 515. Based on a user command, a device may be configured to display a graphic element. The device may analyze image data of display window 500 and determine a passive region. As depicted in FIG. 5A, passive region 520 may be selected for display of graphic element 525. Graphic element 525 is depicted of directional controls for controlling recorded video data. Based, at least in part, on a user command, graphic element 525 may be displayed as depicted in an upper region of the display window. The device may be configured to monitor image data, wherein graphic element 525 may be repositioned and/or resized based on changes to the displayed image data.

Referring now to FIG. 5B, display window 500 is depicted wherein the image data of FIG. 5A has been modified to include the display of graphical element 535. According to one embodiment, based on the change in elements to the display, graphic element 525 may be repositioned to passive region 530 as depicted in FIG. 5B.

Referring now to FIGS. 6A-6B, graphical representations are depicted of a display window and analysis of the regions to determine one or more passive and active regions. Referring first to FIG. 6A, a graphical representation is depicted of a segmenting an image for analyzing content of image data. Image data 600 may be segmented by a grid system wherein pixels associated with each block, depicted as 605, may be analyzed. In certain embodiments, portions of the grid may be analyzed independently of the entire grid to reduce the amount of image data processed. For example, regions 610a-610d may be analyzed either prior to, or in conjunction with, other blocks of image data 600 to determine one or more passive regions.

According to another embodiment, analysis of image data may be limited to predefined areas of a display window which a user may be accustomed to seeing graphic elements. As depicted in FIG. 6B, image data 615 may be analyzed with reference to regions 620a-620b. Analysis of the particular regions may include analysis of subs regions with in each region 620a-620b. One of regions 620a-620b may be selected for display of a graphic element.

Referring now to FIG. 6C, a graphical representation is depicted of image data 625. Image data 625 may be analyzed to determine active and passive regions. The processor may determine active and passive regions based on changes in image data relative to a plurality of frames. Based on the changes, the processor may determine concentrations of change which are associated with active regions depicted by rectangular objects in FIG. 6C as 640 and 645. Based on regions of the image data where image content remains substantially similar a passive region may be determined, such as passive regions 630 and 635. Determination of a passive region may further include analysis of text data which may be dispositive of a graphic element of the image data which is vital. These sections may be denoted as an active region, even though pixel data may be substantially similar for the region.

According to another embodiment, image data may be analyzed to determine a particular region of high activity. For example, image data may be associated with a movie and may include a central region of the display window relating to an active region. FIG. 6D depicts a display window wherein an active region 665 is concentrated within a particular region of the image data. According to one embodiment, multiple graphical elements may be displayed with image data 650, wherein a graphical element is display in a first passive region 655, and a second graphic element is displayed in a second passive region 660. By way of example, the first and second passive regions may include directional commands. Alternatively, passive regions 655 and 660 may be employed to display differing types of graphic elements.

While this disclosure has been particularly shown and described with references to exemplary embodiments thereof, it will be understood by those skilled in the art that various changes in form and details may be made therein without departing from the scope of the embodiments encompassed by the appended claims.

What is claimed is:

1. A method for presenting graphic elements for a display, the method comprising the acts of:
    acquiring image data from a display buffer of a device;
    analyzing, via a processor based apparatus, the image data to identify active and passive regions of the image data;
    ranking passive regions to determine a confidence measure for each passive region; and
    modifying the image data for display on the device to include a graphic element, wherein the graphic element is presented in a passive region based on the ranking;
    wherein ranking passive regions includes cascade filtering of image regions to create color gradients and mean gradient values for the region.

2. The method of claim 1, wherein the image data is acquired from a frame buffer of the device.

3. The method of claim 1, wherein acquiring image data includes segmenting the image data into one or more images.

4. The method of claim 1, wherein the image data is acquired prior to display by the device.

5. The method of claim 1, wherein the image data is acquired during display by the device.

6. The method of claim 1, wherein the image data is buffered video data, including at least one of a graphic element and text data.

7. The method of claim 1, wherein the image data is image data for display as a user interface for on at least one of a mobile device, display device, and media player.

8. The method of claim 1, wherein analyzing the image data includes at least one of corner detection and moving window histogram analysis to identify active and passive regions.

9. The method of claim 1, wherein analyzing image data includes sampling one of sequential and non-sequential frames of the image data.

10. The method of claim 1, wherein an active region includes one or more of image data with a high probability of text and image data exhibiting a variation of color components of varying degrees.

11. The method of claim 1, wherein passive region includes one or more of image data having a low probability of text and image data exhibiting a high correlation to particular color components.

12. The method of claim 1, wherein modifying image data of the display includes adding one or more graphic elements to the display output.

13. The method of claim 1, further comprising modifying one or more of shape and presentation size of a graphic element based on characteristics of a passive region.

14. A computer program product including computer executable code stored on computer readable medium for presenting image data, the computer program product comprising:
    computer readable code to acquire image data from a display buffer of a device;
    computer readable code to analyze the image data to identify active and passive regions of the image data;
    computer readable code to rank passive regions to determine a confidence measure for each passive region; and
    computer readable code to modify the image data for display on the device to include a graphic element, wherein the graphic element is presented in a passive region based on the ranking;
    wherein ranking passive regions includes cascade filtering of image regions to create color gradients and mean gradient values for the region.

15. The computer program product of claim 14, wherein the image data is acquired from a frame buffer of the device.

16. The computer program product of claim 14, wherein acquiring image data includes segmenting the image data into one or more images.

17. The computer program product of claim 14, wherein the image data is acquired prior to display by the device.

18. The computer program product of claim 14, wherein the image data is acquired during display by the device.

19. The computer program product of claim 14, wherein the image data is buffered video data, including at least one of a graphic element and text data.

20. The computer program product of claim 14, wherein the image data is image data for display as a user interface for on at least one of a mobile device, display device, and media player.

21. The computer program product of claim 14, wherein analyzing the image data includes at least one of corner detection and moving window histogram analysis to identify active and passive regions.

22. The computer program product of claim 14, wherein analyzing image data includes sampling one of sequential and non-sequential frames of the image data.

23. The computer program product of claim 14, wherein an active region includes one or more of image data with a high probability of text and image data exhibiting a variation of color components of varying degrees.

24. The computer program product of claim 14, wherein passive region includes one or more of image data having a low probability of text and image data exhibiting a high correlation to particular color components.

25. The computer program product of claim 14, wherein modifying image data of the display includes adding one or more graphic elements to the display output.

26. The computer program product of claim 14, further comprising modifying one or more of shape and presentation size of a graphic element based on characteristics of a passive region.

27. A device comprising:
a display buffer; and
a processor coupled to the display buffer, the processor configured to
acquire image data from the display buffer;
analyze the image data to identify active and passive regions of the image data;
rank passive regions to determine a confidence measure for each passive region; and
modify the image data for display on the device to include a graphic element, wherein the graphic element is presented in a passive region based on the ranking;
wherein ranking passive regions includes cascade filtering of image regions to create color gradients and mean gradient values for the region.

28. The device of claim 27, wherein the device relates to one or more of a display device, personal communication device, handheld computing device, and computing device in general.

* * * * *